Aug. 30, 1966  Y. B. G. MAZERY  3,269,748
LOAD ADJUSTING AND ARTICULATING VEHICLE HITCHING DEVICE
Filed Sept. 4, 1963

INVENTOR
Yves Bertrand Gilbert Mazery
BY Wenderoth,
Lind and Ponack, ATTORNEYS

United States Patent Office 3,269,748
Patented August 30, 1966

3,269,748
LOAD ADJUSTING AND ARTICULATING VEHICLE HITCHING DEVICE
Yves Bertrand Gilbert Mazery, 5 Wellington Ave., Quatre Bornes, Mauritius
Filed Sept. 4, 1963, Ser. No. 306,501
Claims priority, application France, Sept. 4, 1962, 24A; June 26, 1963, 939,438; Great Britain, Aug. 1, 1963, 30,573/63
5 Claims. (Cl. 280—405)

This invention is concerned with a hitching device for connecting a trailer or an agricultural implement to a tractor or similar vehicle.

The object of the invention is to provide such a hitching device which gives improved stability to the coupled together vehicles while travelling and which has the advantages of easy operation and a short turning radius between the vehicles, and efficient utilization of a tractor with agricultural implements.

In accordance with the invention a trailer or the like is coupled to a tractor or similar vehicle by at least one trailer drawbar each swinging about a first hinge point on the tractor and also by at least one length-adjustable link pivotally mounted on the trailer, above said at least one drawbar, and each swingably connected to said tractor about a second hinge point above and co-axial with said first hinge point, both of said hinge points being provided on a rigid frame structure which is swingable about an axis which lies inboard of and parallel to said rear axle.

Preferably said rigid structure embraces the rear axle of the tractor and includes paired support assemblies disposed on opposite sides of a differential gear casing enclosing the tractor rear axle. The frame structure may comprise a pair of circular discs or drums mounted inwardly offset with respect to the rear axle of the tractor, one adjacent each rear wheel thereon, with the centres of said discs lying inboard of the rear wheel axis, each disc being embraced by a strap which is rotatable on said disc. The straps each have two rearwardly extending upper and lower arms which converge toward common junctions carrying vertically disposed, axially aligned first and second hinge points for pivotal connection by said drawbar and said link respectively to the trailer, so that the two discs and their embracing straps and arms are disposed symmetrically in relation to the hinge axis. The discs may be fixed or rockable about or otherwise displaceable relatively to the rear axle.

Figure 1:
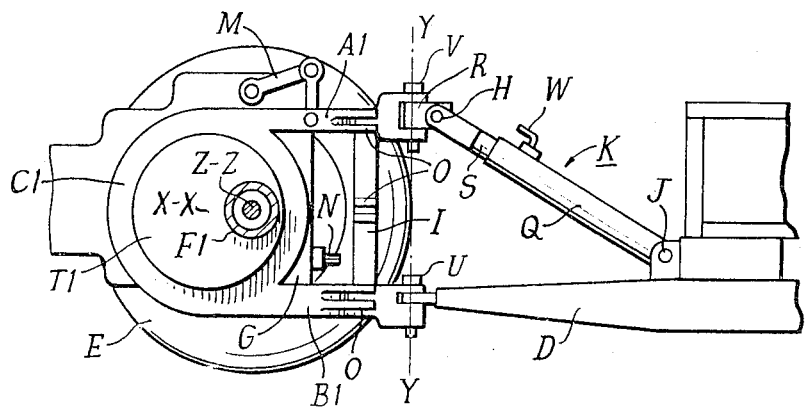
Figure 2:
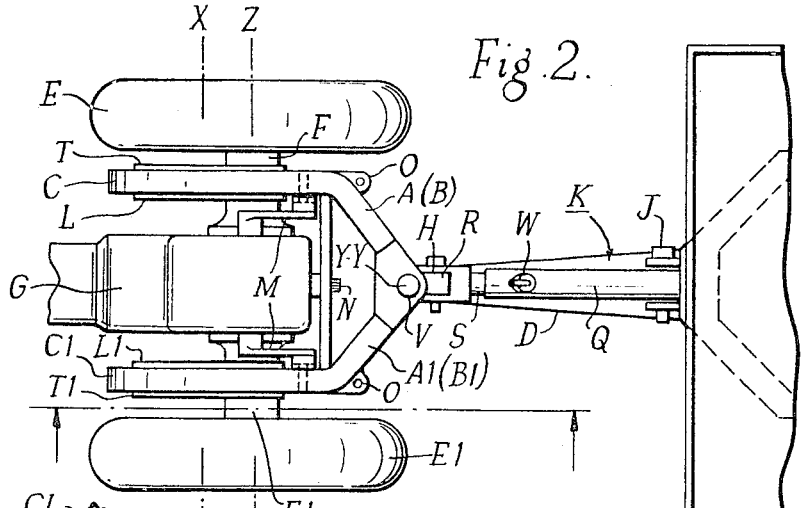
Figure 3:
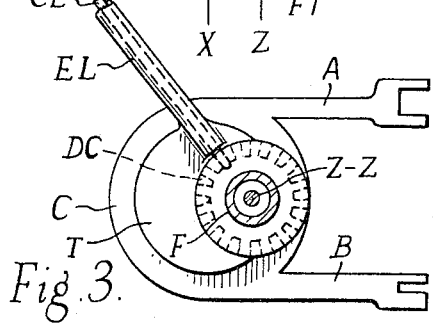
Figure 4:
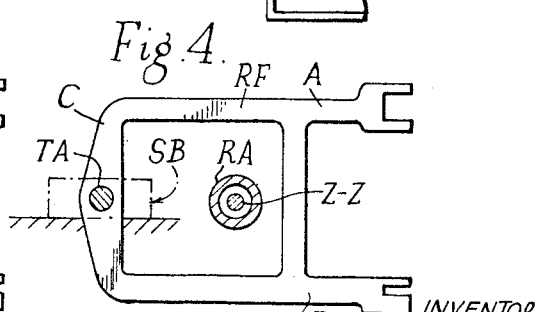

An embodiment of the invention is illustrated, by way of example, in the accompanying drawing, wherein:

FIGURE 1 is a part-sectional side view of the rear part of a tractor and the front part of a trailer coupled together by means of a hitching device according to the invention, FIGURE 2 is a plan thereof, and FIGURES 3 and 4 are diagrammatic views of modifications hereinafter referred to.

The hitching device illustrated in FIGURES 1 and 2 comprises a pair of similar circular flanged discs T, $T^1$ which lie adjacent and parallel to the respective rear wheels E, $E^1$ and are mounted on the offside and nearside half casings F, $F^1$ of the rear axle. The transverse axis X—X of discs T, $T^1$ lies inboard of the rear-axle axis Z—Z. The discs T, $T^1$ thus flank the differential axle casing G with its power take-off spindle N.

The discs T, $T^1$ are embraced by circular straps or collars C, $C^1$ respectively, the strap C having upper and lower rearwardly extending arms A and B respectively and strap $C^1$ having similar arms $A^1$, $B^1$. The straps C, $C^1$ may thus rotate or rock about discs T, $T^1$ and any suitable locking means L, $L^1$ may be provided for clamping the straps and discs in required relative positions. The two upper arms A, $A^1$ converge toward a common junction, at the vertical axis Y—Y of the two hinge points previously referred to, and similarly the two lower arms B, $B^1$ (arm B is not visible) converge to another common junction on the same axis Y—Y. Rigidity is imparted to the straps and their arms by struts or braces I.

The straps C, $C^1$ with paired arms A, $A^1$ and B, $B^1$ form a unitary frame structure P rockable about axis X—X.

The struts or braces I between the strap arms of frame structure P allow of free vertical oscillation or rocking of said frame structure P upon the discs T, $T^1$, without interfering with the rearwardly extending power take-off spindle N. There is also an unobstructed space between the laterally spaced braced arms of frame structure P which affords good visibility for the tractor driver during hitching and unhitching operations.

At the lower hinge point is a pivot pin U by means of which the drawbar D of the trailer is swingably attached to the tractor, and at the upper hinge point, is a pivot pin V which engages a swingable swivel block R. Between a cross pin H in swivel block R and a universal joint J situated above and adjacent the inner end of drawbar D is a telescopic stay K comprising an outer tube Q and an inner tube or plunger S which may be secured together by any suitable fastener W to hold the stay K at a required adjusted length.

To facilitate the hitching and unhitching operations the rigid frame structure P may be raised and lowered by hand-operated means or, as shown, by hydraulically operated levers M extending from a lift mechanism situated above the differential G.

In an alternative arrangement the discs T, $T^1$ are mounted for rotation about axis Z—Z, whereby it is possible to alter the position of axis X—X relatively to the rear axle axis Z—Z, and thus move the effective centre of pressure of the load according to requirements and the nature of the work to be carried out.

When the trailer is to be hitched to the tractor the trailer drawbar D is secured to the tractor by hinge pin U, there being a degree of swivelling at this point to allow for some lateral tilting. Similarly there is a degree of lateral swivelling possible at universal joint J where telescopic stay K is attached to the trailer, while the equivalent of a universal joint is provided by hinge pin V and swivel block R where stay K is attached to the tractor.

When the trailer is thus doubly attached to the tractor the load carried by drawbar D tends to force down the lower joint (hinge pin U), while the corresponding upward thrust exerted at the upper joint (hinge pin V) by the stay K maintains the assembly at a setting determined by the lengths of the fixed length drawbar D and the adjustable length stay K; accordingly the assembly becomes rigid in the vertical plane.

Nevertheless, the vertical flexibility necessary on account of the surface of the ground over which the trailer is towed is obtained by the oscillation or rocking of the straps C, $C^1$ of frame structure P upon the discs T, $T^1$ which really support the towed load. In consequence the load exerts a pressure along a line which passes through axis X—X, which is situated inboard of the rear axle— that is, between the front and rear axles of the tractor, and the load is thus more effectively distributed over the four wheels of the tractor.

Horizontal flexibility is obtained along axis Y—Y (that is, hinge joints U and V) which is situated outboard of the rear axle, so that a short turning radius may be adopted. The proportion of the load carried by the front wheels and rear wheels respectively of the tractor may be changed by similarly angularly adjusting straps C, $C^1$ about discs T, T¹ and locking them in those positions by locks L, L¹ or, in the alternative arrangement referred to, by rotating the axis X—X of discs T, T¹ about the rear axle axis Z—Z.

To facilitate the attachment of agricultural implements the frame structure P may be provided with a number of pairs of eyed lugs O to receive towing links.

If desired a mechanical or hydraulically-operated jack may be provided at the lower hinge point U to facilitate the hitching of a fully laden trailer. Provision may be made for adjusting the height of universal joint J relatively to the drawbar D. The torque which tends to raise the front part of the tractor, when pulling heavy loads, may be compensated for by employing double-acting cylinder units (associated with lever M) or some other suitable means (such as a simple hydraulic piston or a mechanical lever), so as to apply adjustable compensating pressure onto frame structure P.

Instead of rotating straps C, C¹ on the discs T, T¹ about axis X—X, they may be eccentrically adjusted about the rear axle axis Z—Z, as shown, for example, in FIG. 3, where a dog clutch DC operated by lever CL from the tractor driver's seat is used to lock a disc (T or T¹) in desired angular position after its adjustment by means of another lever EL. Alternatively, discs T, T¹ may be displaceable in the direction of the longitudinal axis of the tractor upon suitable slideways.

FIGURE 4 illustrates two further modifications, firstly, the use of a transverse axle TA parallel to the rear axle RA, supporting interconnected paired frames RF, instead of using discs T, T¹; secondly, the frame axle TA may be mounted, if desired, on a block SB slidable on the tractor.

It will be appreciated that a hitching device according to this invention may be fitted to various types of known tractors and adapted for different loading conditions.

I claim:

1. A device for hitching a trailer or the like to a tractor or similar vehicle having a rear axle, said device comprising a rigid frame structure, frame mounting means on which said frame is pivotally mounted, said frame mounting means being adapted to be mounted on the tractor with the pivotal axis of said frame structure parallel to and forward of the rear axle of the tractor, said frame structure having two vertically spaced coaxial hinge points thereon, said hinge points being to the rear of the rear axle of the tractor when the frame structure is mounted on the tractor, the lower of said hinge points comprising means for hitching at least one trailer drawbar to the frame structure for pivotal movement about a vertical axis, and at least one length-adjustable link having one end pivotally connected to the upper of said hinge points for universal pivotal movement, the other end of said length-adjustable link having means thereon for pivotally connecting the link to the trailer, and frame structure rocking means connected to said frame structure and adapted to be coupled to the tractor for rocking said frame about the pivotal axis of the frame structure.

2. A device as claimed in claim 1 in which said frame mounting means comprise a pair of circular disc members adapted to be mounted on the tractor forwardly of the rear axle of the tractor with the centers of the discs on the said pivotal axis of the frame structure, and said frame structure comprises a strap around each disc which is rotatable on the disc, rearwardly extending upper arms extending from said straps and converging at the upper hinge point, and rearwardly extending lower arms extending from said straps and converging at the lower hinge point, said disc members, straps and upper and lower arms being disposed symmetrically in relation to the hinge points.

3. A device as claimed in claim 2 in which said discs are adapted to be rotatably mounted on said tractor for rotation around the rear axle.

4. A device as claimed in claim 2 in which said discs are adapted to be slidably mounted on said tractor.

5. A device as claimed in claim 2 in which said length-adjustable link is a telescopic stay.

References Cited by the Examiner
UNITED STATES PATENTS

| | | | |
|---|---|---|---|
| 1,524,503 | 1/1925 | Bennett et al. | 280—427 X |
| 1,552,620 | 9/1925 | Knox | 280—461 |
| 2,404,925 | 7/1946 | Sauer | 280—407 |
| 2,487,096 | 11/1949 | Bunting | 280—461 |
| 2,516,813 | 7/1950 | Valin | 280—496 X |

LEO FRIAGLIA, *Primary Examiner.*

R. C. PODWIL, *Assistant Examiner.*